US012643416B2

(12) United States Patent (10) Patent No.: US 12,643,416 B2
Son et al. (45) Date of Patent: *Jun. 2, 2026

(54) VEHICLE EQUIPPED WITH ELECTRIC MOTOR AND STABILITY CONTROL METHOD THEREFOR

(71) Applicants: Kia Corporation, Seoul (KR); Hyundai Motor Company, Seoul (KR)

(72) Inventors: Hui Un Son, Suwon-si (KR); Jea Mun Lee, Seoul (KR); Jae Young Park, Seongnam-si (KR); Young Eun Kim, Hwaseong-si (KR); Sang Joon Kim, Seoul (KR); Sung Hoon Yu, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 77 days.

This patent is subject to a terminal disclaimer.

(21) Appl. No.: 18/894,311

(22) Filed: Sep. 24, 2024

(65) Prior Publication Data

US 2025/0010727 A1 Jan. 9, 2025

Related U.S. Application Data

(63) Continuation of application No. 17/459,574, filed on Aug. 27, 2021, now Pat. No. 12,122,247.

(30) Foreign Application Priority Data

Sep. 23, 2020 (KR) ........................ 10-2020-0122917

(51) Int. Cl.
B60L 15/20 (2006.01)
B60K 6/26 (2007.10)

(52) U.S. Cl.
CPC ............ B60L 15/2018 (2013.01); B60K 6/26 (2013.01); B60L 2240/14 (2013.01);
(Continued)

(58) Field of Classification Search
CPC ............ B60L 15/2018; B60L 2240/14; B60L 2240/423; B60L 2240/642; B60L 2240/68;
(Continued)

(56) References Cited

U.S. PATENT DOCUMENTS

2010/0332096 A1* 12/2010 Hanzawa ............. B60K 31/047
701/70
2011/0106388 A1 5/2011 Boeckenhoff et al.
(Continued)

FOREIGN PATENT DOCUMENTS

JP 2013226052 A 10/2013
JP 2019059418 A 4/2019

*Primary Examiner* — Kyle J Kingsland
(74) *Attorney, Agent, or Firm* — Slater Matsil, LLP

(57) ABSTRACT

A method of controlling stability of a motorized vehicle having an electric motor as a drive source includes determining a slope of a road ahead, when sensing a sudden slope change point as a result of determination, determining a correction section based on the sudden slope change point, and correcting stability control torque in the correction section to compensate for motion of the vehicle body due to a change in the slope of the road using a pitching motion of the vehicle body caused by the torque of the electric motor.

20 Claims, 10 Drawing Sheets

(52) U.S. Cl.
CPC ... *B60L 2240/423* (2013.01); *B60L 2240/642*
(2013.01); *B60L 2240/68* (2013.01); *B60L*
*2250/26* (2013.01); *B60Y 2200/91* (2013.01);
*B60Y 2200/92* (2013.01); *B60Y 2300/02*
(2013.01); *B60Y 2300/18066* (2013.01); *B60Y*
*2300/60* (2013.01)

(58) Field of Classification Search
CPC .. B60L 2250/26; B60L 15/20; B60L 2260/50;
B60K 6/26; B60Y 2200/91; B60Y
2200/92; B60Y 2300/02; B60Y
2300/18066; B60Y 2300/60; B60Y
2400/304; B60W 2050/0049; B60W
2520/105; B60W 2540/10; B60W
2552/15; B60W 30/14; B60W 30/16;
B60W 50/0097; B60W 2554/802; B60W
2556/50; B60W 2710/083; B60W
2720/30; B60W 30/02; B60W 10/08;
B60W 30/18072; B60W 40/02; B60W
40/076; Y02T 10/64; Y02T 10/72; Y02T
90/16

See application file for complete search history.

(56)                   References Cited

U.S. PATENT DOCUMENTS

| 2013/0296105 A1 | 11/2013 | Grutter et al. |
| 2016/0347202 A1 | 12/2016 | Sawada et al. |
| 2019/0071080 A1* | 3/2019 | Shimizu .............. G05D 1/0246 |
| 2021/0245746 A1 | 8/2021 | Arai |
| 2022/0223423 A1 | 7/2022 | Li et al. |

* cited by examiner

-Prior Art-

-Prior Art-

-Prior Art-

610

Upper Limit

STABILITY CONTROL TORQUE

Upper Limit

- TORQUE OFFSET

STABILITY CONTROL TORQUE

Lower Limit

Lower Limit

+ TORQUE OFFSET

VEHICLE EQUIPPED WITH ELECTRIC MOTOR AND STABILITY CONTROL METHOD THEREFOR

CROSS-REFERENCE TO RELATED APPLICATIONS

This application is a continuation of U.S. application Ser. No. 17/459,574, filed on Aug. 27, 2021, which claims the benefit of Korean Patent Application No. 10-2020-0122917, filed on Sep. 23, 2020, which application is hereby incorporated herein by reference.

TECHNICAL FIELD

The present disclosure relates to a vehicle equipped with an electric motor, which is capable of correcting control of torque of the motor according to a sudden change in slope.

BACKGROUND

Due to the widespread use of an advanced driver assistance system (ADAS), the increased demand for improved riding comfort, and the spread of motorized vehicles having an electric motor as a drive source, efforts have been made to improve riding comfort by controlling the torque of a motor on an uneven road.

As an example of methods of improving riding comfort, there is a method of determining the condition of a road ahead using an ADAS and controlling the torque of a motor so as to compensate for the motion of the vehicle body, which is predicted according to the determined condition of the road.

This is based on the principle that a vehicle noses down when decelerating and noses up when accelerating. For example, when front wheels pass a depression in the road, the vehicle may nose down. At this moment, if the vehicle is accelerated appropriately, the vehicle may move in a nose-up orientation, whereby the motion of the vehicle body may be stabilized.

SUMMARY

Accordingly, the present disclosure is directed to a vehicle equipped with an electric motor and a stability control method therefor that substantially obviate one or more problems due to limitations and disadvantages of the related art.

The present disclosure provides a vehicle equipped with an electric motor, which provides further improved riding comfort, and a stability control method therefor.

Particularly, the present disclosure provides a vehicle equipped with an electric motor, which is capable of implementing stability control for improving riding comfort in consideration of a change in slope, and a stability control method therefor.

However, the objects to be accomplished by some forms of the present disclosure are not limited to the above-mentioned objects, and other objects not mentioned herein will be clearly understood by those skilled in the art from the following description.

In order to accomplish the above and other objects, a method of controlling stability of a motorized vehicle having an electric motor as a drive source in some forms of the present disclosure may include determining the slope of a road ahead, upon sensing a sudden slope change point as a result of the determining, determining a correction section based on the sudden slope change point, and correcting stability control torque in the correction section to compensate for motion of the vehicle body due to a change in the slope of the road using a pitching motion of the vehicle body caused by control of the torque of the electric motor.

In addition, a motorized vehicle in some forms of the present disclosure may include an electric motor as a drive source, a first controller configured to control the electric motor, and a second controller configured to determine the slope of a road ahead, to, upon determining that a sudden slope change point is sensed, determine a correction section based on the sudden slope change point, to correct stability control torque in the correction section to compensate for motion of a vehicle body due to a change in the slope of the road using a pitching motion of the vehicle body caused by control of the torque of the electric motor, and to transmit a torque command to which the corrected stability control torque is applied to the first controller.

BRIEF DESCRIPTION OF THE DRAWINGS

The accompanying drawings, which are included to provide a further understanding of the disclosure and are incorporated in and constitute a part of this application, illustrate form(s) of the disclosure and together with the description serve to explain the principle of the disclosure. In the drawings.

DETAILED DESCRIPTION OF ILLUSTRATIVE EMBODIMENTS

Figure 1A:
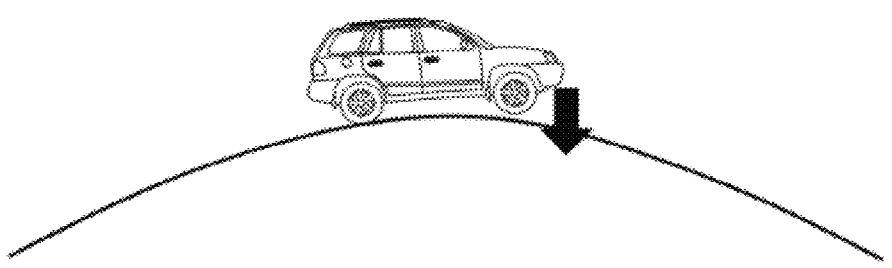
FIGS. 1A and 1B are diagrams showing a problem with motor torque control according to a sudden change in the slope of a road.

Hereinafter, forms of the present disclosure will be described in detail with reference to the accompanying drawings so that those skilled in the art may easily carry out the forms. The present disclosure may, however, be embodied in many different forms, and should not be construed as being limited to the forms set forth herein. In the drawings, parts irrelevant to the description of the present disclosure will be omitted for clarity. Like reference numerals refer to like elements throughout the specification.

Throughout the specification, when a certain part "includes" or "comprises" a certain component, this indicates that other components are not excluded, and may be further included unless otherwise noted. The same reference numerals used throughout the specification refer to the same constituent elements.

According to an form of the present disclosure, in a vehicle equipped with a motor (hereinafter referred to as a "motorized vehicle" for convenience of description), in the process of performing vehicle stability control for improving riding comfort using the pitching motion of the vehicle body according to a change in the torque of the motor, when it is determined that there is a sudden slope change point ahead, correction of stability control torque is performed near the sudden slope change point. Examples of the motorized vehicle that is applicable to the form may include an electric vehicle (EV), a hybrid electric vehicle (HEV), and a fuel cell electric vehicle (FCEV). However, the form is not limited to any specific type of motorized vehicle, so long as the motorized vehicle is configured to control torque transmitted to wheels using an electric motor.

In addition, the sudden slope change point may be a point within a predetermined distance from which the sign of the slope changes, like a transition from an uphill slope to a downhill slope, but a change in the sign of the slope is not essential. For example, the sudden slope change point may also include a point at which the slope greatly changes between values having the same sign, for example, a change from a slope of 5 degrees to a slope of 25 degrees.

In the situation in which the slope of the road changes suddenly, motor torque control for improving riding comfort may cause a problem, which will be described below with reference to FIGS. 1A and 1B.

Figure 1B:
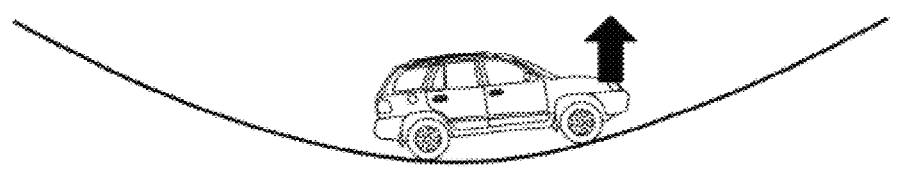

FIGS. 1A and 1B are diagrams showing a problem with motor torque control according to a sudden change in the slope of the road.

FIG. 1A shows a sudden change from an uphill slope to a downhill slope, and FIG. 1B shows a sudden change from a downhill slope to an uphill slope. In the situation shown in FIG. 1A or 1B, a change in the attitude of the vehicle body due to a sudden change in the slope of the road may correspond to pitching of the vehicle body.

For example, in the case of FIG. 1A, when the vehicle is located at a peak, at which an uphill slope changes to a downhill slope, the vehicle is expected to nose down, so the vehicle is accelerated in order to reduce pitching of the vehicle. However, when the vehicle is accelerated in this situation, in particular, in the case of a front-wheel-drive vehicle, the front drive wheels may move away from the road surface and may slip, thus leading to reduction of driving force or braking force.

On the other hand, in the case of FIG. 1B, when the vehicle is located at the bottom of a valley, at which the downhill slope changes to the uphill slope, the vehicle is expected to nose up, so the vehicle is decelerated in order to reduce pitching of the vehicle. However, when the vehicle is decelerated at the starting point of the uphill road, the driving force of the vehicle may become insufficient to travel on the uphill road, and the vehicle may roll back on the uphill road in severe cases.

Conventionally, in order to prevent the above problems, motor torque control for improving riding comfort is prohibited from being executed when the slope of the road exceeds a predetermined level. In addition, because estimation of the slope of the road using an acceleration sensor of the vehicle is not immediately implemented, it may take a long time to estimate the slope of the road, particularly when the vehicle moves from a flat road section to a sloped road section or vice versa. This will be described below with reference to FIG. 2.

Figure 2:
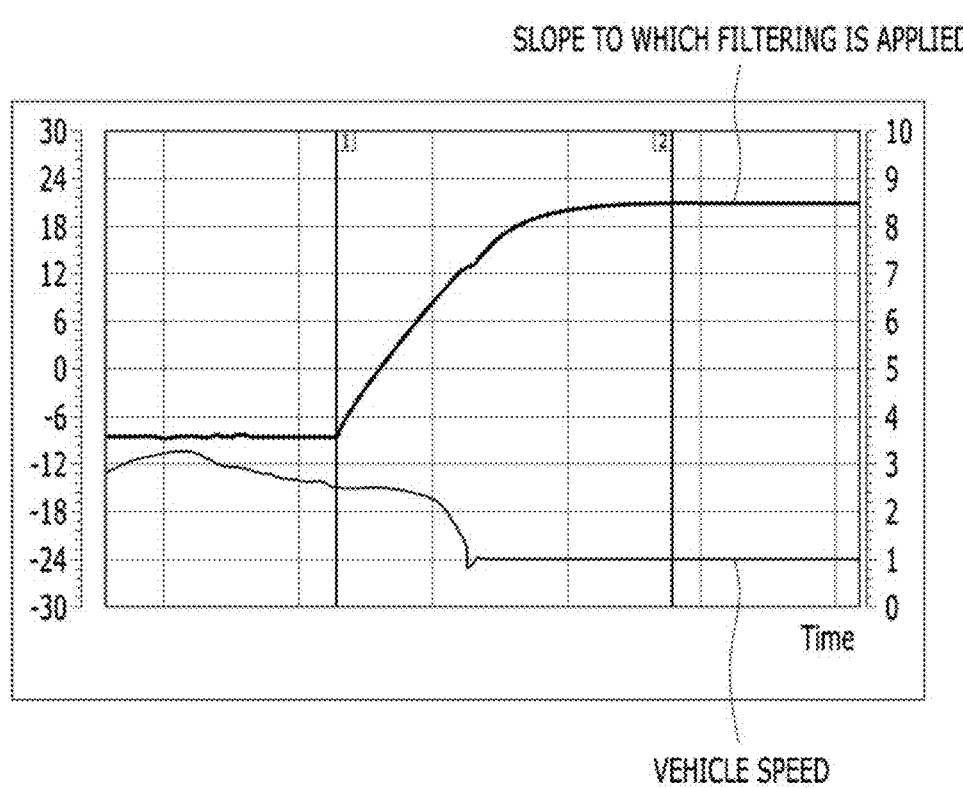
FIG. 2 shows an example of a slope value determined using an acceleration sensor in a sudden slope change section.

FIG. 2 shows an example of a slope value determined using an acceleration sensor in a sudden slope change section.

Referring to FIG. 2, while passing through a section in which the slope changes sharply from −8% to 21%, the speed of the vehicle decreases close to 0. In this state, even when the vehicle enters a section in which the slope does not substantially change, the slope value obtained by filtering the output value of the acceleration sensor converges to a final value after a long time. In a vehicle, estimation of the slope of the road is usually calculated based on the difference between the value sensed by the acceleration sensor and the wheel acceleration. Because sensor noise, noise attributable to pitching of the vehicle, and noise attributable to resolution when differentiating the wheel speed are present, filtering using a low-pass filter (LPF) is strongly applied, thus causing the delay mentioned above.

Of course, in order to solve the problem with estimation of the slope, there is a method of limiting control torque by applying a low-pass filter (LPF), a rate limiter, and a delay to the slope value, thereby preventing the situation in which control is mistakenly started upon entering a sloped road section. However, this method has a problem in that the overall control performance for improving riding comfort is deteriorated.

Figure 3:
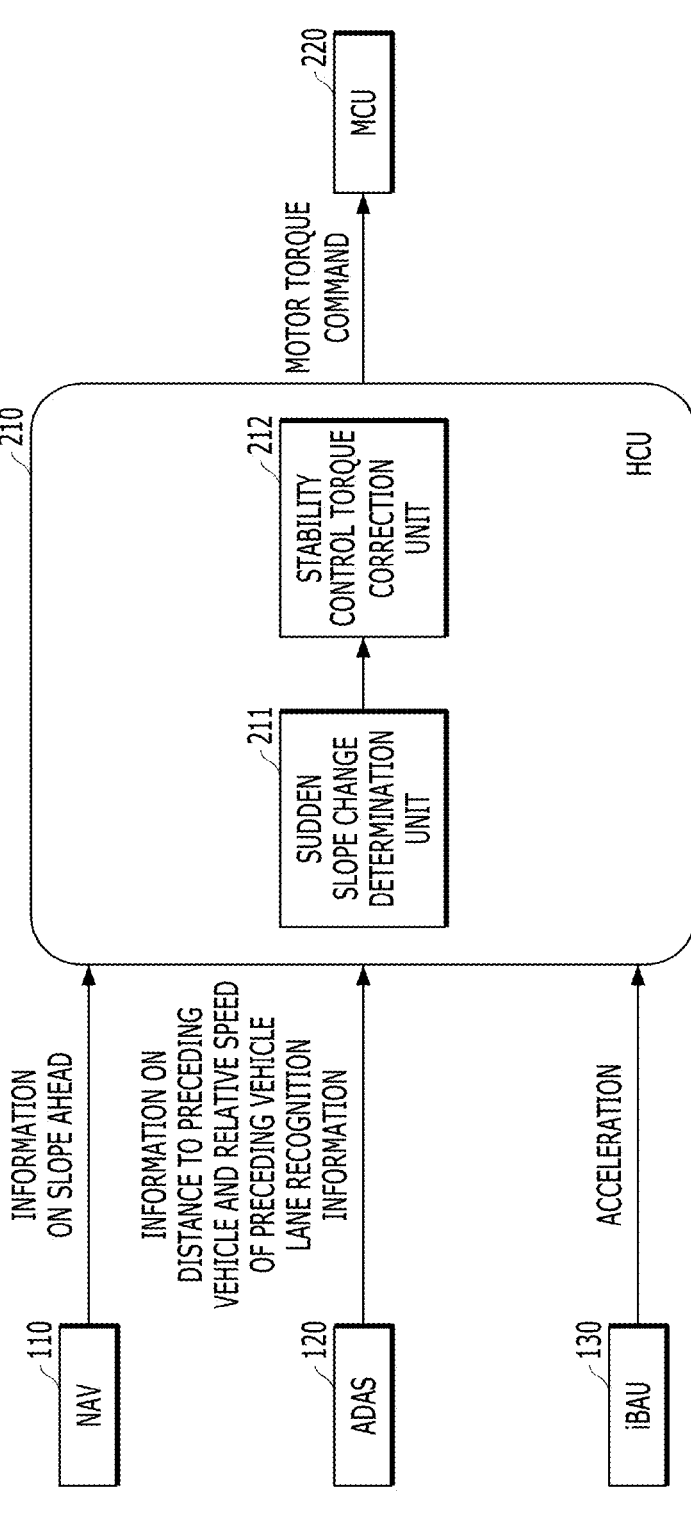
FIG. 3 shows an example of the configuration of a motorized vehicle in some forms of the present disclosure.

FIG. 3 shows an example of the configuration of a motorized vehicle in some forms of the present disclosure.

Referring to FIG. 3, the motorized vehicle may include information acquisition devices 110, 120 and 130 configured to acquire information based on which the slope of a road ahead is determined, a controller 210 configured to correct stability control torque based on the information acquired by the information acquisition devices, and a controller 220 configured to control an electric motor (not shown) supplying driving force to wheels.

The information acquisition devices may include a navigation system 110, an advanced driver assistance system (ADAS) 120, and a device 130 including an acceleration sensor.

Here, the ADAS 120 may be implemented in any of various forms, so long as it has a function capable of sensing a preceding vehicle (including the distance thereto and the relative speed thereof) and a function capable of sensing lanes. For example, the preceding vehicle sensing function may be a smart cruise control (SCC) function, and the lane sensing function may be a lane keeping assist (LKA) function or a lane departure warning (LDW) function. However, the forms are not limited thereto.

The device 130 including the acceleration sensor may be an integrated brake assist unit (iBAU), but the forms are not limited thereto.

The controller 220 for controlling the electric motor may be a motor control unit (MCU), and the controller 210 for correcting the stability control torque may be an upper-level controller relative to the MCU 220, and may be capable of transmitting a torque command to the MCU 220. For example, when the vehicle is a hybrid electric vehicle (HEV), the controller 210 for correcting the stability control torque may be a hybrid control unit (HCU), and when the vehicle is an electric vehicle (EV), the controller 210 may be a vehicle control unit (VCU). However, this is merely given by way of example, and the forms are not limited thereto.

In addition, the term "unit" or "control unit" included in the integrated brake assist unit (iBAU), the motor control unit (MCU), and the hybrid control unit (HCU) is a term that is widely used in naming a controller for controlling a specific function of a vehicle, and does not mean a generic function unit. For example, in order to control the inherent function thereof, each controller may include a communication device configured to communicate with other controllers or sensors, a memory configured to store an operating system, a logic command, and input/output information, and one or more processors configured to perform determinations, calculations, and decisions required for control of the inherent function.

Hereinafter, for convenience of description, it is assumed that the controller 210 for correcting the stability control torque is a hybrid control unit (HCU).

In some forms of the present disclosure, the navigation system 110 may provide information on the slope ahead, the ADAS 120 may provide information on the presence or absence of a preceding vehicle, the distance from the host vehicle to the preceding vehicle, and the relative speed of the preceding vehicle, and the iBAU 130 may provide information on acceleration acquired by the acceleration sensor.

The HCU 210 may include a sudden slope change determination unit 211 and a stability control torque correction unit 212. Based on at least one of multiple pieces of information acquired by the navigation system 110, the ADAS 120, and the iBAU 130, the sudden slope change determination unit 211 may determine whether there is a sudden slope change section ahead, and may set a stability control torque correction section in which correction of the stability control torque is to be performed. In addition, the stability control torque correction unit 212 may correct the stability control torque in the stability control torque correction section through at least one of application of an offset, change of the upper limit or lower limit of torque, or change of a control gain. Accordingly, the HCU 210 may transmit a torque command corresponding to the torque, obtained by adding the corrected stability control torque to requested torque in accordance with manipulation of the accelerator pedal or the brake pedal by the driver, to the motor control unit 220.

Hereinafter, a process of determining a sudden slope change section by the sudden slope change determination unit 211 will be described in more detail with reference to FIGS. 4 to 6.

Figure 4:
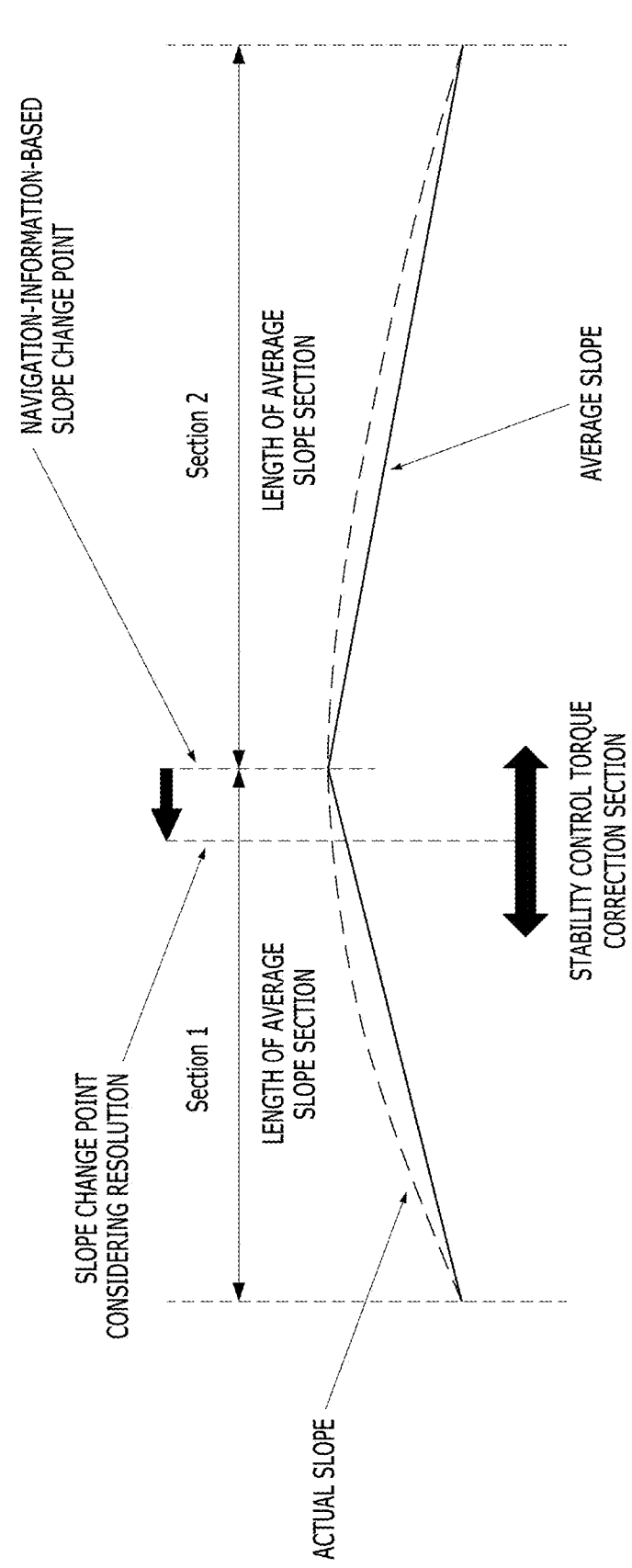
FIG. 4 is a diagram showing an example of a process of determining a sudden slope change section based on navigation information and an example of a process of setting a stability control torque correction section in some forms of the present disclosure.

FIG. 4 is a diagram showing an example of a process of determining a sudden slope change section based on navigation information and an example of a process of setting a stability control torque correction section in some forms of the present disclosure.

The sudden slope change determination unit 211 may determine a slope change point based on slope information included in map information of the navigation system 110. In general, the resolution of the slope information of the navigation system 110 may be divided into short-range resolution and long-range resolution. In this case, it is preferable to determine a slope change point based on the short-range resolution in order to reduce an error, but the forms are not limited thereto.

For example, as shown in FIG. 4, the sudden slope change determination unit 211 may determine a point between a section in which the average slope corresponds to an uphill slope (section 1) and a section in which the average slope corresponds to a downhill slope (section 2) to be a slope change point, and may set a point located a short-range resolution distance (e.g. 2 m) ahead of the slope change point to a reference point. The reason for this is to minimize an error due to the resolution. The sudden slope change determination unit 211 may set a stability control torque correction section based on the reference point. For example, the sudden slope change determination unit 211 may determine a section ahead of and behind the reference point within a predetermined distance to be a stability control torque correction section.

Figure 5:
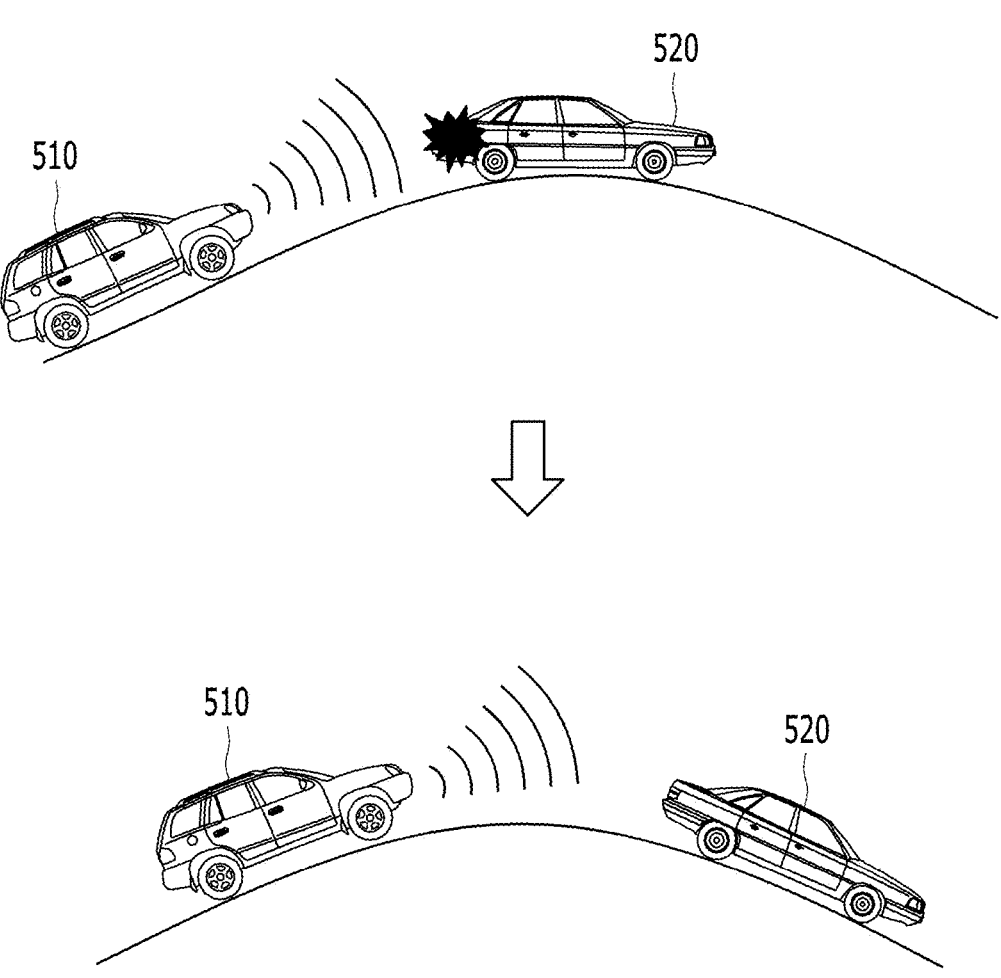
FIG. 5 shows an example of a process of determining a sudden slope change section depending on whether a preceding vehicle is sensed in some forms of the present disclosure.

FIG. 5 shows an example of a process of determining a sudden slope change section depending on whether a preceding vehicle is sensed in some forms of the present disclosure.

Referring to the upper drawing in FIG. 5, in the state in which a preceding vehicle 520 traveling in front of the host vehicle 510 on an uphill road is sensed, when the slope changes sharply to a downhill slope, the preceding vehicle 520 may not be sensed by the ADAS 120, as shown in the lower drawing in FIG. 5.

Therefore, in the state of setting the stability control torque correction section, as described above with reference to FIG. 4, and sensing the preceding vehicle using the ADAS 120 within a critical distance from the reference point, if the preceding vehicle is not recognized, the sudden slope change determination unit 211 may reset the point at which the preceding vehicle is not recognized to a reference point. Accordingly, the stability control torque correction section may also be corrected. Here, the critical distance from the reference point may be the same as or different from the distance from the reference point for setting the stability control torque correction section.

Figure 6:
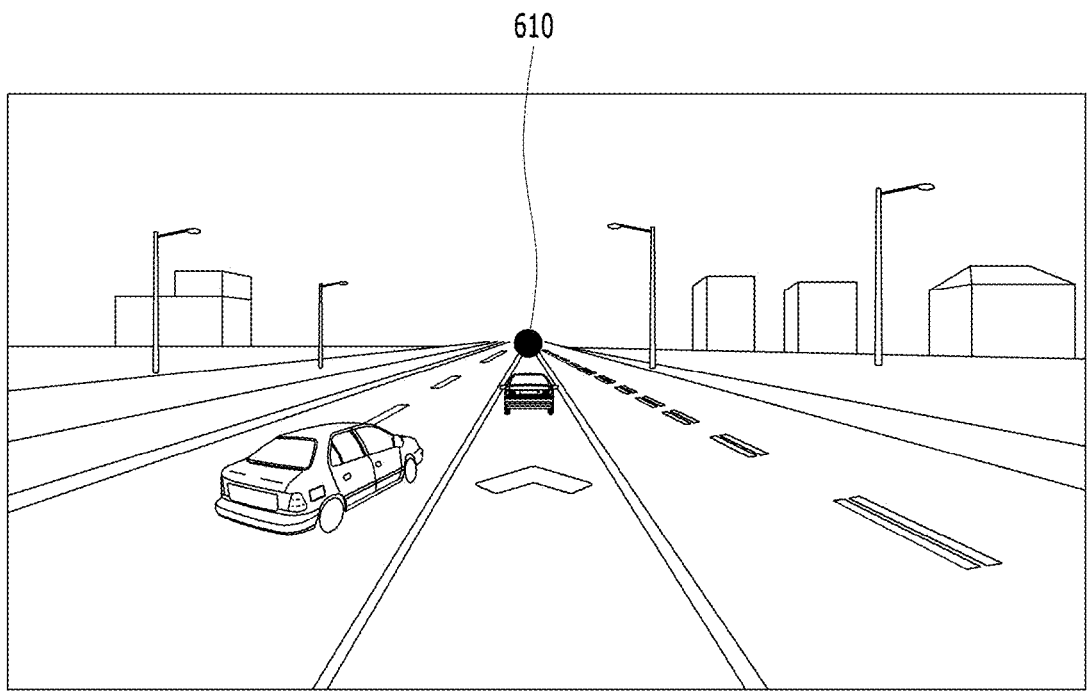
FIG. 6 shows an example of a process of determining a sudden slope change section based on a lane vanishing point in some forms of the present disclosure.

FIG. 6 shows an example of a process of determining a sudden slope change section based on a lane vanishing point in some forms of the present disclosure.

Referring to FIG. 6, when lane detection is possible, a point 610 at which extension lines of a lane converge in the area ahead may be referred to as a vanishing point. However, the vanishing point mentioned in some forms of the present disclosure also conceptually includes a point at which extension lines of a lane seem to vanish. For example, extension lines of a lane seem to vanish at a point at which a slope changes sharply from an uphill slope to a downhill slope. Therefore, in the state of setting the stability control torque correction section, as described above with reference to FIG. 4, if the sudden slope change determination unit 211 determines that a vanishing point is located within the critical distance from the reference point using the ADAS 120, the sudden slope change determination unit 211 may reset the point at which the vanishing point is located to a reference point. Accordingly, the stability control torque correction section may also be corrected. Here, the critical distance from the reference point may be the same as or different from the distance from the reference point for setting the stability control torque correction section.

Meanwhile, in the case of estimating the slope based on acceleration sensed by the acceleration sensor as described above, because sensor noise, noise attributable to pitching of the vehicle, and noise attributable to resolution when differentiating the wheel speed are present, filtering using a low-pass filter (LPF) is strongly applied, thus causing a long delay. Therefore, in some forms of the present disclosure, when estimating the slope based on the acceleration value within the critical distance from the reference point, which is set through the navigation system 110 or is corrected through the ADAS 120, the sudden slope change determination unit 211 omits or minimizes filtering, thereby enabling rapid recognition of the sudden slope change point. This information may be used when the sudden change in slope ends and the stability control torque correction control is thus terminated.

Hereinafter, a specific process of performing the stability control torque correction control will be described with reference to FIGS. 7A to 8C.

Figure 7A:
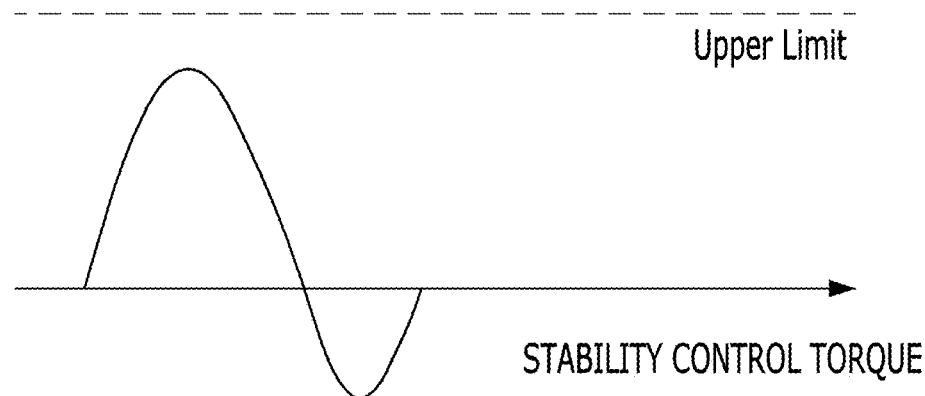
FIGS. 7A to 7C show an example of a process of correcting stability control torque when a slope changes sharply from an uphill slope to a downhill slope in some forms of the present disclosure.
Figure 7B:
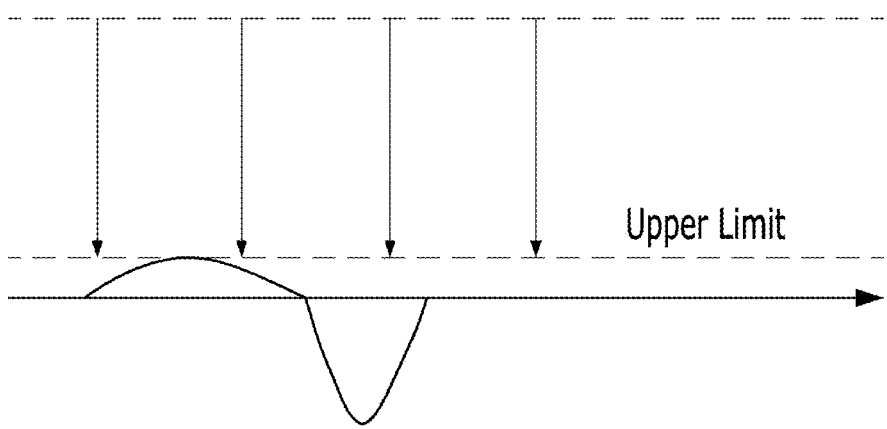
Figure 7C:
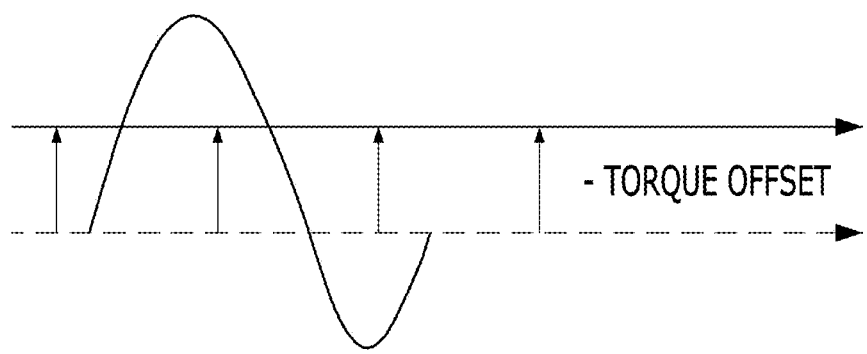

FIGS. 7A to 7C show an example of a process of correcting the stability control torque when the slope changes sharply from an uphill slope to a downhill slope in some forms of the present disclosure.

When the slope changes sharply from an uphill slope to a downhill slope, the vehicle noses down at the slope change point. At this time, general stability control is performed such that stability control torque is generated so as to accelerate the vehicle, thereby compensating for the nose-down motion, as shown in FIG. 7A.

However, in this form of the present disclosure, the stability control torque is corrected in the stability control torque correction section in order to improve the stability of the vehicle. When a vehicle speed control function, such as a cruise control or speed limiter function, is being performed, the stability control torque is corrected in the manner of lowering a (+) directional control gain, thereby preventing the vehicle from being accelerated in the sudden slope change section.

In another form of the present disclosure, when the driver operates the accelerator pedal or the vehicle is coasting, an up-rate limit may be enhanced so that the torque increase rate is limited even if the driver operates the accelerator pedal.

In still another form of the present disclosure, when a coasting torque variable function, such as smart regenerative braking, is being performed, coasting torque (−) may be increased.

The above-described correction processes may be summarized as follows. As shown in FIG. 7B, the upper limit of the stability control torque may be lowered in order to prevent the vehicle from accelerating. Alternatively, as shown in FIG. 7C, an offset value corresponding to (−) torque calculated based on slope change information may be linearly added to the stability control torque.

The stability control torque correction process shown in FIG. 7B or 7C may also be applied to a traffic-calmed area such as a child protection zone, and may induce deceleration of the vehicle, thereby improving the stability of the vehicle.

Figure 8A:
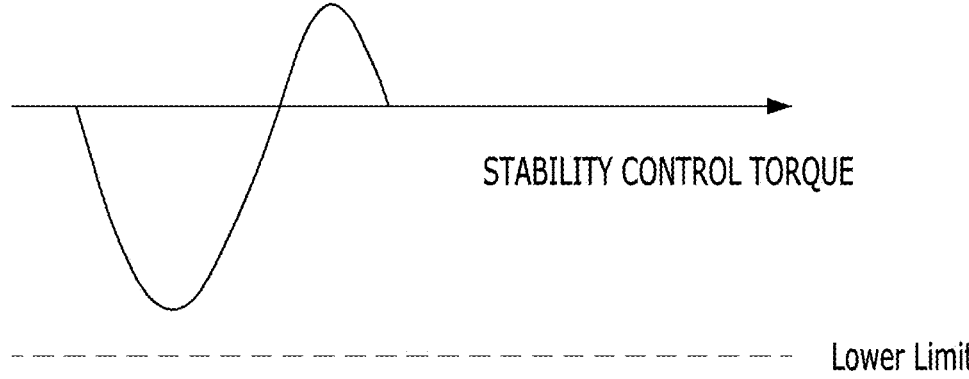
FIGS. 8A to 8C show an example of a process of correcting stability control torque when a slope changes sharply from a downhill slope to an uphill slope in some forms of the present disclosure.
Figure 8B:
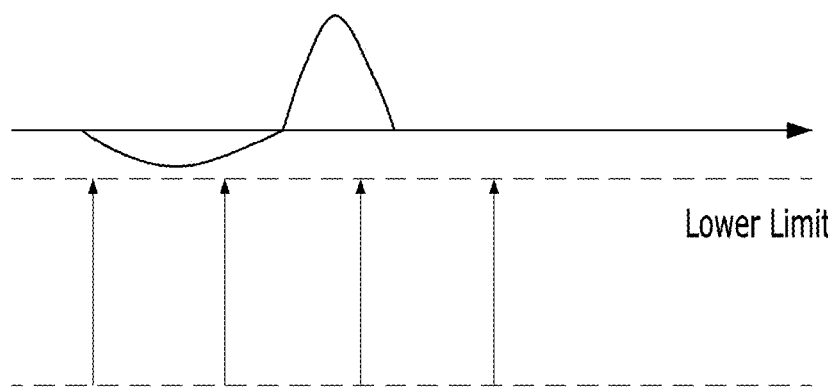
Figure 8C:
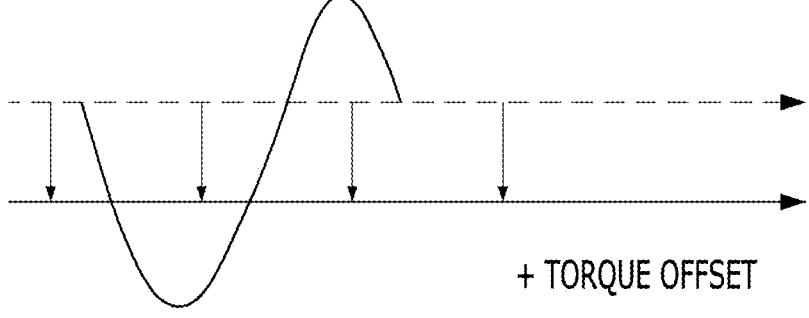

FIGS. 8A to 8C show an example of a process of correcting the stability control torque when the slope changes sharply from a downhill slope to an uphill slope in some forms of the present disclosure.

When the slope changes sharply from a downhill slope to an uphill slope, the vehicle noses up at the slope change point. At this time, general stability control is performed such that stability control torque is generated so as to decelerate the vehicle, thereby compensating for the nose-up motion, as shown in FIG. 8A.

However, in this form, the stability control torque is corrected in the stability control torque correction section in order to improve the stability of the vehicle. When a vehicle speed control function, such as a cruise control or speed limiter function, is being performed, the stability control torque is corrected in the manner of lowering a (−) directional control gain, thereby preventing the vehicle from decelerating in the sudden slope change section.

In another form of the present disclosure, when the driver operates the accelerator pedal or the vehicle is coasting, a down-rate limit may be enhanced so that the deceleration rate is limited.

In still another form of the present disclosure, when a coasting torque variable function, such as smart regenerative braking, is being performed, coasting torque (−) may be decreased.

The above-described correction processes may be summarized as follows. As shown in FIG. 8B, the lower limit of the stability control torque may be increased in order to prevent the vehicle from decelerating. Alternatively, as shown in FIG. 8C, an offset value corresponding to (+) torque calculated based on slope change information may be linearly added to the stability control torque.

Hereinafter, the above-described process of correcting the stability control torque according to the slope change situation will be described with reference to FIG. 9.

Figure 9:
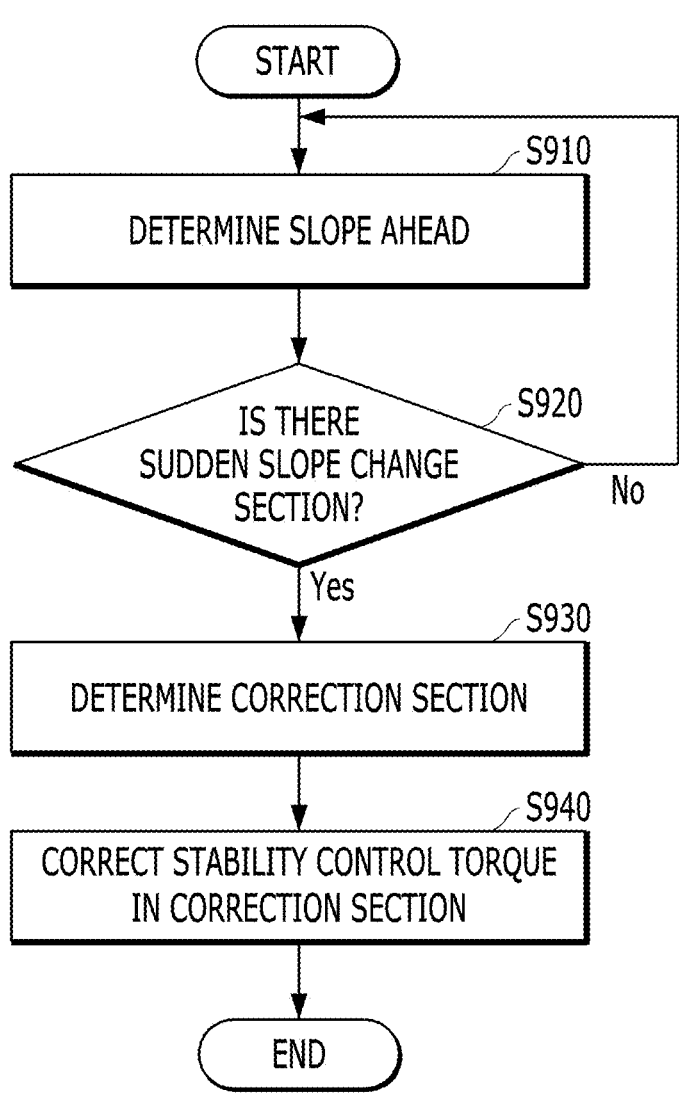
FIG. 9 is a flowchart showing an example of a stability control torque correction process in some forms of the present disclosure.

FIG. 9 is a flowchart showing an example of a stability control torque correction process in some forms of the present disclosure.

Referring to FIG. 9, the sudden slope change determination unit 211 may determine the slope of a road ahead based on at least one of information on the slope of a road ahead acquired by the navigation system 110, preceding vehicle information and lane recognition information acquired by the ADAS 120, or acceleration sensor information acquired by the iBAU 130 (S910), and may determine whether there is a sudden slope change section based thereon (S920).

Upon determining that there is a sudden slope change section (Yes in S920), the sudden slope change determination unit 211 may set a reference point based on the navigation-information-based slope change point and the resolution, and may set a stability control torque correction section based on the reference point (S930). Here, the reference point may be corrected using the methods described above with reference to FIGS. 5 and 6.

Thereafter, when the vehicle reaches the set stability control torque correction section, the stability control torque correction unit 212 may correct the stability control torque in consideration of the change in slope in the correction section (S940). Since the correction process has been described above with reference to FIGS. 7A to 8C, a duplicate description thereof will be omitted.

According to the forms described so far, when stability control for improving riding comfort is performed in a motorized vehicle using the pitching motion of the vehicle body according to a change in the torque of a motor, it is possible to output stability control torque in a sloped road section, whereby the size of a control area may be increased. In addition, side effects due to the output of the stability control torque in a sudden slope change section are reduced through correction of the stability control torque, whereby the commercial value of the vehicle may be increased. In addition, the correction for preventing acceleration of the vehicle may also be applied to a traffic-calmed area such as a child protection zone.

The present disclosure may be implemented as code that can be written on a computer-readable recording medium and thus read by a computer system. The computer-readable recording medium includes all kinds of recording devices in which data that may be read by a computer system are stored. Examples of the computer-readable recording medium include a Hard Disk Drive (HDD), a Solid-State Disk (SSD), a Silicon Disk Drive (SDD), Read-Only Memory (ROM), Random Access Memory (RAM), Compact Disk ROM (CD-ROM), a magnetic tape, a floppy disc, and an optical data storage.

As is apparent from the above description, the vehicle equipped with an electric motor according to at least one form of the present disclosure configured as described above provides further improved riding comfort.

Particularly, it is possible to determine a sudden change in the slope of a road in advance and to correct the stability control torque of the motor based thereon, thereby improving riding comfort and securing high power performance.

However, the effects achievable through the disclosure are not limited to the above-mentioned effects, and other effects not mentioned herein will be clearly understood by those skilled in the art from the above description.

It will be apparent to those skilled in the art that various changes in form and details may be made without departing from the spirit and essential characteristics of the disclosure set forth herein. Accordingly, the above detailed description is not intended to be construed to limit the disclosure in all aspects and to be considered by way of example. The scope of the disclosure should be determined by reasonable interpretation of the appended claims and all equivalent modifications made without departing from the disclosure should be included in the following claims.

What is claimed is:

1. A method of controlling a vehicle, comprising:
determining a slope of a road ahead;
determining a sudden slope change point comprising a point where a sign of the slope changes or a point where the slope changes by a predetermined amount as a result of the determination of the slope of the road;
determining a correction section along the road based on the sudden slope change point, the correction section comprising a section before the sudden slope change point on the road; and
correcting a stability control torque in the correction section to compensate for motion of a vehicle body due to a change in the slope of the road using a pitching motion of the vehicle body caused by a torque of an electric motor,
wherein determining the correction section comprises:
determining the sudden slope change point based on slope information obtained using an advanced driver assistance system (ADAS);
setting a reference point ahead of the sudden slope change point based on a resolution of the slope information; and
setting the correction section based on the reference point.

2. The method according to claim 1, wherein determining the sudden slope change point based on the slope information obtained using the ADAS comprises determining the sudden slope change point based on a result of a detection of one of an uphill slope and a downhill slope being changed to the other slope by the ADAS.

3. The method according to claim 1, wherein determining the sudden slope change point based on the slope information obtained using the ADAS comprises determining the sudden slope change point based on a result of a detection of a preceding vehicle by the ADAS.

4. The method according to claim 3, wherein determining the sudden slope change point based on the result of the detection of the preceding vehicle by the ADAS comprises determining the sudden slope change point based on the preceding vehicle being detected as present and then disappearing according to the detection by the ADAS.

5. The method according to claim 1, wherein determining the sudden slope change point based on the slope information obtained using the ADAS comprises determining the sudden slope change point based on a result of a detection of a lane by the ADAS.

6. The method according to claim 5, wherein determining the sudden slope change point based on the result of the detection of the lane by the ADAS comprises determining the sudden slope change point based on a result of a detection of lines of the lane by the ADAS.

7. The method according to claim 1, wherein the ADAS comprises at least one of a smart cruise control (SCC) function, a lane keeping assist (LKA) function, or a lane departure warning (LDW) function.

8. The method according to claim 1, wherein setting the reference point comprises:
setting the reference point ahead of the sudden slope change point at a distance corresponding to the resolution.

9. The method according to claim 1, wherein determining the correction section further comprises:
correcting the reference point based on at least one of acceleration sensor information, information on whether a preceding vehicle is sensed, or information on whether a lane disappears.

10. The method according to claim 9, wherein setting the correction section based on the reference point comprises:
when the reference point is corrected, setting the correction section based on the corrected reference point.

11. The method according to claim 1, wherein, when the slope at the sudden slope change point changes from an uphill slope to a downhill slope, correcting the stability control torque comprises:
lowering an upper limit of the stability control torque; or
applying a negative linear torque offset to the stability control torque.

12. The method according to claim 1, wherein, when the slope at the sudden slope change point changes from an uphill slope to a downhill slope, correcting the stability control torque comprises:
increasing a coasting torque; or
enhancing an up-rate limit of torque increment according to operation of an accelerator pedal.

13. The method according to claim 1, wherein, when the slope at the sudden slope change point changes from a downhill slope to an uphill slope, correcting the stability control torque comprises:
increasing a lower limit of the stability control torque; or
applying a positive linear torque offset to the stability control torque.

14. The method according to claim 1, wherein, when the slope at the sudden slope change point changes from a downhill slope to an uphill slope, correcting the stability control torque comprises:
decreasing a coasting torque; or
enhancing a down-rate limit of torque decrement according to operation of an accelerator pedal.

15. A non-transitory computer-readable recoding medium having a program recorded thereon, the program to direct a processor to perform acts of:
determining a slope of a road ahead;
determining a sudden slope change point comprising a point where a sign of the slope changes or a point where the slope changes by a predetermined amount as a result of the determination of the slope of the road;

determining a correction section along the road based on the sudden slope change point, the correction section comprising a section before the sudden slope change point on the road; and correcting a stability control torque in the correction section to compensate for motion of a vehicle body due to a change in the slope of the road using a pitching motion of the vehicle body caused by a torque of an electric motor, wherein determining the correction section comprises:

determining the sudden slope change point based on slope information obtained using an advanced driver assistance system (ADAS);

setting a reference point ahead of the sudden slope change point based on a resolution of the slope information; and setting the correction section based on the reference point.

16. A vehicle comprising:

an electric motor;

an advanced driver assistance system (ADAS) configured to detect a preceding vehicle or a lane;

a first controller configured to control the electric motor; and a second controller configured to:

determine a slope of a road ahead;

determine a sudden slope change point comprising a point where a sign of the slope changes or a point where the slope changes by a predetermined amount as a result of the determination of the slope of the road;

determine a correction section along the road based on the sudden slope change point, the correction section comprising a section before the sudden slope change point on the road;

correct a stability control torque in the correction section to compensate for motion of a vehicle body due to a change in the slope of the road using a pitching motion of the vehicle body caused by a torque of the electric motor; and transmit, to the first controller, a torque command to which the corrected stability control torque is applied, wherein the second controller is configured to:

determine the sudden slope change point based on slope information obtained using the ADAS;

set a reference point ahead of the sudden slope change point based on a resolution of the slope information; and set the correction section based on the reference point.

17. The vehicle according to claim 16, wherein the second controller is further configured to determine the sudden slope change point based on a result of a detection of one of an uphill slope and a downhill slope being changed to the other slope by the ADAS.

18. The vehicle according to claim 16, wherein the second controller is further configured to determine the sudden slope change point based on a result of a detection of the preceding vehicle by the ADAS.

19. The vehicle according to claim 18, wherein the second controller is further configured to determine the sudden slope change point based on the preceding vehicle being detected as present and then disappearing according to the detection by the ADAS.

20. The vehicle according to claim 16, wherein the second controller is further configured to determine the sudden slope change point based on a result of a detection of the lane by the ADAS.

\* \* \* \* \*